Patented Nov. 6, 1951

UNITED STATES PATENT OFFICE 2,574,448

CATALYTIC DESULFURIZATION OF GAS OIL

Patrick Docksey and Frederick William Bertram Porter, Sunbury-on-Thames, England, assignors to Anglo-Iranian Oil Company Limited, London, England, a British joint-stock corporation No Drawing. Application June 21, 1949, Serial No. 100,538. In Great Britain June 24, 1948

3 Claims. (Cl. 196—28)

The invention relates to the catalytic desulphurisation of petroleum distillates boiling within the gas oil range.

It is known to desulphurise petroleum distillates by passing them in admixture with hydrogen over a sulphur-resistant hydrogenation catalyst at elevated temperature and elevated pressure, whereby organic sulphur compounds present in the distillates are hydrogenated to form hydrogen sulphide which can readily be removed from the treated distillates. The process as normally carried out involves a nett consumption of hydrogen and the cost of supplying the hydrogen is a major factor in the economics of the process. Furthermore, in order to secure the necessary partial pressure of hydrogen, it has generally been considered necessary to operate at elevated pressure ranging from 500-1000 lb./sq. in. or more, and a plant to withstand such pressures has to be made from special steels which are comparatively expensive.

It is well known that the hydroforming process effects considerable desulphurisation and at the same time produces hydrogen mainly by dehydrogenation of the naphthenes present. This process, however, is applicable to a very limited class of feedstock and does not constitute an economic desulphurisation process in view of the fact that the reaction conditions are so severe that the catalyst has a very short active life, and needs to be regenerated at short intervals (for example, of six hours), while the increased production of aromatics is in many cases undesirable.

The invention has among its objects to provide a process for the catalytic desulphurisation of gas oils which can be carried out without the use of hydrogen added from an external source. It is also an object of the invention to enable such a process to be carried out at pressures low enough to avoid the use of special pressure-resisting steels, thereby reducing the cost of the plant.

It has now been found that by careful control of the reaction conditions and that by selecting a suitable catalyst, it is possible to effect desulphurisation of gas oils without adding hydrogen from an external source, the hydrogen necessary for the conversion of the sulphur in the feedstock into hydrogen sulphide being derived from the feedstock itself.

According to the invention, the desulphurisation of a naphthene-containing petroleum distillate boiling within the gas oil range is effected by vapourising the distillate and passing it in admixture with hydrogen over a catalyst which combines activity for dehydrogenation of naphthene molecules to aromatics, with activity for the conversion of organically combined sulphur to hydrogen sulphide, and which is not poisoned as a catalyst by the presence of sulphur compounds, at a temperature and at a pressure sufficient to effect the conversion of a considerable proportion of the sulphur contained in the distillate into hydrogen sulphide, and to produce a hydrogen-rich gas mixture which is separated from the treated feedstock and recycled to the reaction zone at a rate sufficient to maintain the necessary partial pressure of hydrogen therein It is believed that the reaction proceeds by dehydrogenation of some of the naphthenes to produce hydrogen in excess of that required to convert the combined sulphur present into hydrogen sulphide, and the reaction conditions must therefore be determined having regard to any limiting conditions imposed by these two reactions. Thus, there is a lower temperature of about 700° F. below which little dehydrogenation would occur and below which the reaction would not be self-supporting in hydrogen. This lower temperature depends to some extent on the sulphur content, and the higher the sulphur content, the higher the minimum temperature necessary to provide sufficient hydrogen. At temperatures above about 800° F., dehydrogenation occurs to such an extent that the product becomes increasingly aromatic. Furthermore, at temperatures above 800° F. the on-stream time is reduced. The preferred temperature of operation is to some extent dependent upon the pressure employed, which is preferably between 50 and 200 lb./sq. in., and lies within the range 750-820° F. As the pressure is increased, the minimum temperature at which satisfactory dehydrogenation of the naphthenes can be obtained increases, and if at a fixed temperature the pressure is sufficiently increased. the reverse reaction of hydrogenation of aromatics begins to occur. Thus, when operating at the higher pressures, it is preferable to use higher temperatures. Similarly it is desirable to avoid the combination of high temperature and low pressure since such conditions lead to short on-stream time for satisfactory operation.

The preferred space velocity lies between 1 and 2 v./v./hr., while the preferred recycle rate for the hydrogen-containing gases lies between 2000 and 4000 c. f. b. In general, the higher gas recycle rates should be employed at the lower space velocities in order to shorten the residence time within the reactor.

Operating under the conditions above described, the gases separated by cooling the treated fraction at reaction pressure contains 75-80% by volume or more of hydrogen and are continuously recycled to the desulphurisation zone. It has been found that the hydrogen sulphide content of the separated gas builds up to an equilibrium concentration after which the gases may be recycled to the desulphurisation zone without further increase in the content of hydrogen sulphide which is thereafter dissolved in the product until such time as it is depressurised. If desired, however, the hydrogen sulphide may be removed from the gases by any of the usual methods and the hydrogen sulphide-free gas recycled to the desulphurisation zone. The gases may be submitted to treatment in known manner for increasing the relative proportion of hydrogen therein, as by passage through an oil tower. It is not necessary to supply extraneous hydrogen to the desulphurisation zone when starting the process as the gases separated from the treated fraction may be allowed to build up to form the recycle gas.

Among the catalysts that may be used are metal sulphides and oxides especially those of the 6th group, either alone (for example chromium oxide and tungsten sulphide) or in admixture with other sulphides or oxides (for example, pellets consisting of two parts tungsten sulphide and one part nickel sulphide), or in combination with other oxides or sulphides (for example, cobalt molybdate or thiomolybdate) or mixed with, or deposited on, a porous support such as natural or processed bauxite, activated alumina and kieselguhr. Natural and processed bauxite may themselves be used as catalysts. The preferred catalyst consists of cobalt molybdate supported on alumina.

An effective pelleted catalyst was prepared by mixing powdered cobalt oxide, molybdate oxide and alumina, and pelleting with 1% graphite into $\frac{1}{8}''$ pellets which were then treated for two hours at 550° C. The catalyst may also be prepared by extrusion.

An effective cobalt molybdate type catalyst was prepared by the impregnation of roasted Indian bauxite with cobalt-molybdate solution, so that the molybdenum content of the material stable at 1000° F. was 3.6% by weight, while the cobalt content of the material stable at 1000° F. was 1.0% weight.

The results of various operations carried out on a gas oil of Iranian origin are set out in the following Tables 1–11. In each case, the catalyst employed consisted of cobalt molybdate on alumina, the cobalt molybdate containing an excess of molybdenum oxide.

Tables 1–5 illustrate the effect of varying the pressure within the range 50–150 p. s. i. ga. at a constant temperature of approximately 780° F., a space velocity of the feedstock of 2 v./v./hr. and a gas recycle rate of 2000 c. f. b. It will be noted that increase of pressure within the range 50–150 p. s. i. ga. results in increased desulphurisation, the residual sulphur being inversely proportional to the hydrogen partial pressure. Desulphurisation at 150 p. s. i. ga. is about 80% compared with about 40% at 50 p. s. i. ga.

It will be apparent from a consideration of Tables 7, 3 and 6 that the effect of varying the temperature within the range 760–800° F., with the pressure, space velocity and gas recycle rate constant, is slight, with maximum desulphurisation at 780° F.

The net gas make decreases with increase in pressure and increases with increase in temperature.

Tables 8–11 illustrate the effect of varying the space velocity between 1.0 and 2.0 v./v./hr. and of varying the gas recycle rate between 2000 and 4000 c. f. b. Over 100 hrs. on stream were possible at 2.0 v./v./hr. and 200 hrs. at 1.0 v./v./hr., with a recycle rate of 4000 c. f. b. The average residual sulphur at 2.0 v./v./hr. was 0.4% wt. and at 1.0 v./v./hr. it was 0.3% wt. using a feedstock of 1.0% wt. sulphur. Alteration of the recycle rate from 4000 to 2000 c. f. b. has little or no effect at 2.0 v./v./hr. but results in a marked loss of desulphurisation and gas make at 1.0 v./v./hr.

It appears that the most efficient operation is at 1.0 v./v./hr. and 4000 c. f. b. and the marked improvement at 1.0 v./v./hr. as compared with 2.0 v./v./hr. is surprising in view of the fact that the ratio of the hydrogen partial pressure at 2000 and 4000 c. f. b. is approximately 1:1.1.

TABLE 1

Run No. CP/47/53

| Test period No. | Feedstock | 1 | 2 | 3 | 4 | 5 | 6 |
|---|---|---|---|---|---|---|---|
| Hours on stream since regeneration | | 10 | 27 | 50 | 75 | 001 | 115 |
| *Operating Conditions* | | | | | | | |
| Catalyst charge, vol. ml. | 964 | | | | | | |
| Catalyst charge, wt. g. | 903 | | | | | | |
| No. of regenerations | 8 | | | | | | |
| Total life of catalyst hr. | | 1,104 | 1,121 | 1,144 | 1,169 | 1,194 | 1,209 |
| Direction of flow | Downward | | | | | | |
| Average catalyst bed temperature °F. | | 785 | 785 | 788 | 789 | 785 | 779 |
| Reactor pressure p. s. i. ga. | | 50 | 50 | 50 | 50 | 50 | 50 |
| Space velocity v./v./hr. | | 2.09 | 2.04 | 2.03 | 2.01 | 2.01 | 2.01 |
| Recycle gas rate c. f. b. | | 2,320 | 2,380 | 2,370 | 2,410 | 2,380 | 2,410 |
| Recycle gas density (air=1) | | 0.22 | 0.22 | 0.23 | 0.24 | 0.24 | 0.24 |
| Recycle gas mol. per cent $H_2$ (±1%) | | 85 | 85 | 84 | 83 | 83 | 83 |
| Gas make c. f. b. | | 67.5 | 51.7 | 34.7 | 23.4 | 18.1 | 14.6 |
| *Liquid Product* | | | | | | | |
| Per cent wt. on feedstock | 100.0 | | 99.4 | 99.2 | 98.3 | 100.3 | 100.0 |
| Specific gravity, 60°/60° F. | 0.8545 | 0.8485 | 0.8480 | 0.8475 | 0.8475 | 0.8480 | 0.8520 |
| Gravity °A. P. I. | 34.1 | 35.3 | 35.4 | 35.5 | 35.5 | 35.4 | 34.6 |
| *Distillation* | | | | | | | |
| I. B. P. °C. | 239 | 165 | 143 | 170 | 189 | 171 | 199.5 |
| 2% Vol. @ °C. | 245 | 218 | 229 | 236 | 234.5 | 238 | 241 |
| 5% Vol. @ °C. | 256 | 250 | 251 | 251 | 250 | 258 | 255.5 |
| 10% Vol. @ °C. | 267.5 | 264.5 | 263 | 263.5 | 264 | 267 | 266.5 |
| 20% Vol. @ °C. | 277.5 | 275 | 273.5 | 274 | 275 | 272 | 276.5 |
| 30% Vol. @ °C. | 282 | 280 | 280 | 280 | 279 | 276.5 | 282 |
| 40% Vol. @ °C. | 287 | 285.5 | 286 | 286 | 284 | 283 | 287 |
| 50% Vol. @ °C. | 291.5 | 290.5 | 292 | 291 | 290 | 289 | 291 |
| 60% Vol. @ °C. | 297 | 296 | 298 | 296.5 | 296 | 296 | 296.5 |
| 70% Vol. @ °C. | 302 | 302.5 | 305 | 302.5 | 303 | 301.5 | 302 |
| 80% Vol. @ °C. | 308.5 | 310 | 311 | 311 | 311 | 310 | 308 |
| 90% Vol. @ °C. | 321.5 | 323 | 324 | 324 | 326 | 322.5 | 320 |
| F. B. P. °C. | 349 | 352 | 350.5 | 350.5 | 353 | 347 | 349 |
| Total distillate per cent vol. | 99 | 99.5 | 99 | 99.5 | 99 | 99 | 99 |
| Residue+loss per cent vol. | 1 | 0.5 | 1 | 0.5 | 1 | 1 | 1 |
| Sulphur per cent wt. | 1.00 | 0.598 | 0.566 | 0.607 | 0.674 | 0.674 | 0.701 |
| Sulphur removal per cent | | 40.2 | 43.4 | 39.3 | 34.6 | 32.6 | 29.9 |

TABLE 2

Run No. CP/47/99

| Test period No. | | Feedstock | 1 | 2 | 3 | 4 | 5 |
|---|---|---|---|---|---|---|---|
| Hours on stream since regeneration | | | 12 | 20 | 30 | 40 | 52 |
| *Operating Conditions* | | | | | | | |
| Catalyst charge | vol. ml | 988 | | | | | |
| Catalyst charge | wt. g | 942 | | | | | |
| No. of regenerations | | 13 | | | | | |
| Total life of catalyst | hr | | 1,431 | 1,439 | 1,449 | 1,459 | 1,471 |
| Direction of flow | | Downward | | | | | |
| Average catalyst bed temperature | °F | | 782 | 780 | 779 | 780 | 779 |
| Reactor pressure | p. s. i. ga | | 75 | 75 | 75 | 75 | 75 |
| Space velocity | v./v./hr | | 2.00 | 1.98 | 2.00 | 1.98 | 1.98 |
| Recycle gas rate | c. f. b | | 2,020 | 2,030 | 2,020 | 2,030 | 2,030 |
| Recycle gas density (air=1) | | | 0.22 | 0.24 | 0.24 | 0.25 | 0.24 |
| Recycle gas mol. per cent $H_2$ (±1%) | | | 85 | 83 | 83 | 81.5 | 83 |
| Gas make | c. f. b | | 50.5 | 36.3 | 28.1 | 23.6 | 19.9 |
| *Liquid Product* | | | | | | | |
| Per cent wt. on feedstock | | 100.0 | 99.8 | 99.7 | 99.7 | 99.5 | 99.9 |
| Specific gravity, 60°/60° F | | 0.8520 | 0.8460 | 0.8470 | 0.8460 | 0.8475 | 0.8460 |
| Gravity | °A. P. I | 34.6 | 35.8 | 35.6 | 35.8 | 35.5 | 35.8 |
| *Distillation* | | | | | | | |
| I. B. P. | °C | 224 | 135 | 126 | 147 | 158 | 182 |
| 2% Vol. @ | °C | 252 | 219 | 199.5 | 219.5 | 235 | 221 |
| 5% Vol. @ | °C | 263 | 239 | 241 | 243.5 | 252 | 247 |
| 10% Vol. @ | °C | 272 | 260 | 260 | 264 | 264 | 261 |
| 20% Vol. @ | °C | 278.5 | 274 | 274 | 274.5 | 277 | 275.5 |
| 30% Vol. @ | °C | 283.5 | 280 | 280 | 280 | 281 | 281.5 |
| 40% Vol. @ | °C | 288.5 | 285 | 285 | 286 | 287 | 285.5 |
| 50% Vol. @ | °C | 292 | 290 | 289 | 290.5 | 291 | 290.5 |
| 60% Vol. @ | °C | 297 | 294.5 | 294.5 | 295.5 | 296 | 295.5 |
| 70% Vol. @ | °C | 304 | 300 | 300 | 301.5 | 301.5 | 301.5 |
| 80% Vol. @ | °C | 310 | 308.5 | 308.5 | 308.5 | 309 | 309 |
| 90% Vol. @ | °C | 320 | 319 | 319 | 320 | 321 | 320.5 |
| F. B. P. | °C | 357.5 | 348.5 | 349 | 352 | 353 | 353 |
| Total distillate | per cent vol | 99 | 99 | 99 | 99 | 99 | 99 |
| Residue+loss | per cent vol | 1 | 1 | 1 | 1 | 1 | 1 |
| Sulphur | per cent wt | 1.00 | 0.448 | 0.457 | 0.473 | 0.498 | 0.519 |
| Sulphur removal | per cent | | 55.2 | 54.3 | 52.7 | 50.2 | 48.1 |

TABLE 3

Run No. CP/47/100

| Test Period No. | | Feedstock | 1 | 2 | 3 | 4 | 5 |
|---|---|---|---|---|---|---|---|
| Hours on stream since regeneration | | | 14 | 24 | 32 | 40 | 50 |
| *Operating Conditions* | | | | | | | |
| Catalyst charge | vol. ml | 988 | | | | | |
| Catalyst charge | wt. g | 942 | | | | | |
| No. of regenerations | | 14 | | | | | |
| Total life of catalyst | hr | | 1,485 | 1,495 | 1,503 | 1,511 | 1,521 |
| Direction of flow | | Downward | | | | | |
| Average catalyst bed temperature | °F | | 781 | 779 | 774 | 780 | 777 |
| Reactor pressure | p. s. i. ga | | 100 | 100 | 100 | 100 | 100 |
| Space velocity | v./v./hr | | 1.96 | 1.96 | 1.98 | 1.94 | 1.96 |
| Recycle gas rate | c. f. b | | 2,050 | 2,050 | 2,040 | 2,060 | 2,050 |
| Recycle gas density (air=1) | | | 0.26 | 0.23 | 0.26 | 0.27 | 0.28 |
| Recycle gas mol. per cent $H_2$ (±1%) | | | 80.5 | 84 | 80.5 | 79 | 78 |
| Gas Make | c. f. b | | 44.3 | 27.4 | 19.0 | 16.7 | 15.4 |
| *Liquid Product* | | | | | | | |
| Per cent wt. on feedstock | | 100.0 | | 99.8 | 98.3 | 99.2 | 98.8 |
| Specific gravity, 60°/60° F | | 0.8545 | 0.8475 | 0.8475 | 0.8480 | 0.8485 | 0.8485 |
| Gravity | °A. P. I | 34.1 | 35.5 | 35.5 | 35.4 | 35.3 | 35.3 |
| *Distillation* | | | | | | | |
| I. B. P. | °C | 239 | 132 | 133 | 154 | 140 | 151 |
| 2% vol. @ | °C | 254 | 198 | 224 | 209 | 228 | 220.5 |
| 5% vol. @ | °C | 264 | 235 | 244 | 241.5 | 248 | 242 |
| 10% vol. @ | °C | 272 | 255 | 258.5 | 257 | 261 | 260 |
| 20% vol. @ | °C | 279 | 272 | 274 | 274 | 275.5 | 273 |
| 30% vol. @ | °C | 284 | 279 | 280 | 280.5 | 281.5 | 280 |
| 40% vol. @ | °C | 288.5 | 284 | 285 | 285 | 286 | 285.5 |
| 50% vol. @ | °C | 293 | 289 | 290 | 290 | 290.5 | 290.5 |
| 60% vol. @ | °C | 298 | 294 | 295 | 295 | 295.5 | 295.5 |
| 70% vol. @ | °C | 303.5 | 300 | 300.5 | 300 | 301.5 | 301.5 |
| 80% vol. @ | °C | 310 | 307.5 | 308 | 308 | 308.5 | 308.5 |
| 90% vol. @ | °C | 322.5 | 319 | 319 | 319 | 319.5 | 320 |
| F. B. P. | °C | 351.5 | 353 | 353 | 353 | 351 | 351.5 |
| Total distillate | per cent vol | 99 | 99 | 99 | 99 | 99 | 99 |
| Residue+loss | per cent vol | 1 | 1 | 1 | 1 | 1 | 1 |
| Sulphur | per cent wt | 0.974 | 0.314 | 0.340 | 0.345 | 0.385 | 0.400 |
| Sulphur removal | per cent | | 67.8 | 65.1 | 64.6 | 60.5 | 58.9 |

TABLE 4

*Run No. CP/47/97*

| Test period No. | | Feedstock | 1 | 2 | 3 |
|---|---|---|---|---|---|
| Hours on stream since regeneration | | | 11 | 21 | 29 |
| *Operating Conditions* | | | | | |
| Catalyst charge | vol. ml | 988 | | | |
| Catalyst charge | wt. g | 942 | | | |
| No. of regenerations | | 11 | | | |
| Total life of catalyst | hr | | 1,351 | 1,361 | 1,369 |
| Direction of flow | | Downward | | | |
| Average catalyst bed temperature | °F | | 781 | 779 | 779 |
| Reactor pressure | p. s. i. ga | | 125 | 125 | 125 |
| Space velocity | v./v./hr | | 1.98 | 1.97 | 1.97 |
| Recycle gas rate | c. f. b | | 2,070 | 2,080 | 2,080 |
| Recycle gas density (air=1) | | | 0.25 | 0.27 | 0.27 |
| Recycle gas mol. per cent H$_2$ (±1%) | | | 81.5 | 79 | 79 |
| Gas make | c. f. b | | 29 | 13.9 | 11.9 |
| *Liquid Product* | | | | | |
| Per cent wt. on feedstock | | 100.0 | 99.8 | 99.8 | |
| Specific gravity, 60°/60° F | | 0.8510 | 0.8455 | 0.8450 | 0.8455 |
| Gravity | °A. P. I | 34.8 | 35.9 | 36.0 | 35.9 |
| *Distillation* | | | | | |
| I. B. P | °C | 235 | 118 | 122 | 121 |
| 2% vol. @ | °C | 258 | 211 | 213.5 | 215 |
| 5% vol. @ | °C | 265 | 241 | 244 | 244.5 |
| 10% vol. @ | °C | 271 | 256 | 260 | 260.5 |
| 20% vol. @ | °C | 278 | 271.5 | 272.5 | 272 |
| 30% vol. @ | °C | 283 | 279 | 278.5 | 278.5 |
| 40% vol. @ | °C | 288 | 284.5 | 284.5 | 283.5 |
| 50% vol. @ | °C | 292.5 | 289.5 | 290 | 289 |
| 60% vol. @ | °C | 297.5 | 294.5 | 295 | 295 |
| 70% vol. @ | °C | 303.5 | 301.5 | 301.5 | 301.5 |
| 80% vol. @ | °C | 311 | 309 | 309.5 | 310 |
| 90% vol. @ | °C | 323.5 | 321.5 | 322 | 323 |
| F. B. P | °C | 349.5 | 350.5 | 350.5 | 350.5 |
| Total distillate | per cent vol | 99.5 | 99 | 99 | 99 |
| Residue+loss | per cent vol | 0.5 | 1 | 1 | 1 |
| Sulphur | per cent wt | 1.01 | 0.245 | 0.270 | 0.294 |
| Sulphur removal | per cent | | 75.7 | 73.3 | 70.9 |

TABLE 5

*Run No. CP/47/96*

| Test period No. | | Feedstock | 1 | 2 | 3 |
|---|---|---|---|---|---|
| Hours on stream since regeneration | | | 11 | 27 | 51 |
| *Operating Conditions* | | | | | |
| Catalyst charge | vol. ml | 988 | | | |
| Catalyst charge | wt. g | 942 | | | |
| No. of regenerations | | 10 | | | |
| Total life of catalyst | hr | | 1,300 | 1,316 | 1,340 |
| Direction of flow | | Downward | | | |
| Average catalyst bed temperature | °F | | 786 | 782 | 794 |
| Reactor pressure | p. s. i. ga | | 151 | 151 | 150 |
| Space velocity | v./v./hr | | 1.99 | 2.01 | 1.97 |
| Recycle gas rate | c. f. b | | 2,050 | 2,030 | 2,060 |
| Recycle gas density (air=1) | | | 0.26 | 0.28 | |
| Recycle gas mol. per cent H$_2$ (± 1%) | | | 80.5 | 78 | |
| Gas Make | c. f. b | | 24.4 | 5.7 | 2.9 |
| *Liquid Product* | | | | | |
| Per cent wt. on feedstock | | 100.0 | | 99.1 | 99.8 |
| Specific gravity 60°/60° F | | 0.8510 | 0.8435 | 0.8440 | 0.8445 |
| Gravity | A. P. I | 34.8 | 36.3 | 36.2 | 36.1 |
| *Distillation* | | | | | |
| I. B. P | °C | 235 | 123 | 215 | 119 |
| 2% vol. @ | °C | 258 | 219 | 208 | 210 |
| 5% vol. @ | °C | 265 | 240 | 243 | 243 |
| 10% vol. @ | °C | 271 | 252.5 | 260 | 257 |
| 20% vol. @ | °C | 278 | 271.5 | 271 | 273.5 |
| 30% vol. @ | °C | 283 | 279 | 280 | 279.5 |
| 40% vol. @ | °C | 288 | 284 | 285 | 284.5 |
| 50% vol. @ | °C | 292.5 | 289.5 | 290 | 289.5 |
| 60% vol. @ | °C | 297.5 | 295 | 295 | 295 |
| 70% vol. @ | °C | 303.5 | 301 | 301 | 302.5 |
| 80% vol. @ | °C | 311 | 309 | 309 | 310.5 |
| 90% vol. @ | °C | 323.5 | 321.5 | 322 | 323.5 |
| F. B. P | °C | 349.5 | 353.5 | 350.5 | 351 |
| Total distillate | per cent vol | 99.5 | 99 | 99 | 99 |
| Residue+loss | per cent vol | 0.5 | 1 | 1.0 | 1.0 |
| Sulphur | per cent wt | 1.01 | 0.177 | 0.213 | 0.291 |
| Sulphur removal | per cent | | 82.5 | 78.9 | 71.2 |

TABLE 6

*Run No. CP/47/102*

| Test period No. | Feedstock | 1 | 2 | 3 | 4 | 5 |
|---|---|---|---|---|---|---|
| Hours on stream since regeneration | | 10 | 20 | 30 | 40 | 50 |
| *Operating Conditions* | | | | | | |
| Catalyst charge_____vol. ml__ | 988 | | | | | |
| Catalyst charge_____wt. g__ | 942 | | | | | |
| No. of regenerations_____ | 16 | | | | | |
| Total life of catalyst_____hr__ | | 1,560 | 1,570 | 1,580 | 1,590 | 1,600 |
| Direction of flow_____ | Downward | | | | | |
| Average catalyst bed temperature___° F__ | | 800 | 800 | 801 | 800 | 801 |
| Reactor pressure_____p. s. i. ga__ | | 101 | 100 | 100 | 100 | 99 |
| Space velocity_____v./v./hr__ | | 1.97 | 1.96 | 1.97 | 1.97 | 1.97 |
| Recycle gas rate_____c. f. b__ | | 2,080 | 2,050 | 2,040 | 2,040 | 2,020 |
| Recycle gas density (air=1)_____ | | 0.26 | 0.26 | 0.28 | 0.27 | 0.29 |
| Recycle gas mol. per cent $H_2$ (±1%)_____ | | 80.5 | 80.5 | 78 | 79 | 77 |
| Gas make_____c. f. b__ | | 69.1 | 47.4 | 35.4 | 28.9 | 21.7 |
| *Liquid Product* | | | | | | |
| Per cent wt. on feedstock_____ | 100.0 | 99.0 | | 98.9 | 99.1 | 99.5 |
| Specific gravity, 60°/60° F_____ | 0.855 | 0.847 | 0.848 | 0.847 | 0.8485 | 0.8490 |
| Gravity_____° A. P. I__ | 34.0 | 35.6 | 35.4 | 35.6 | 35.3 | 35.2 |
| *Distillation* | | | | | | |
| I. B. P._____° C__ | 237 | 105 | 108 | 118 | 114 | 120 |
| 2% vol. @_____° C__ | 253 | 168 | 195 | 217 | 204 | 228 |
| 5% vol. @_____° C__ | 261 | 229.5 | 237 | 240.5 | 238.5 | 246 |
| 10% vol. @_____° C__ | 268 | 254 | 254 | 254.5 | 258 | 259 |
| 20% vol. @_____° C__ | 276.5 | 270 | 269 | 273 | 272 | 273.5 |
| 30% vol. @_____° C__ | 282.5 | 277.5 | 278 | 279 | 278 | 280.5 |
| 40% vol. @_____° C__ | 287 | 283 | 283.5 | 284 | 285 | 285.5 |
| 50% vol. @_____° C__ | 291.5 | 288 | 291 | 288.5 | 290 | 290.5 |
| 60% vol. @_____° C__ | 296 | 293 | 296 | 294.5 | 295.5 | 295.5 |
| 70% vol. @_____° C__ | 303 | 299 | 301 | 300 | 301.5 | 301 |
| 80% vol. @_____° C__ | 311.5 | 307 | 308 | 308.5 | 310 | 308 |
| 90% vol. @_____° C__ | 323 | 319 | 320 | 321 | 320 | 320.5 |
| F. B. P._____° C__ | 351.5 | 353 | 353 | 353.5 | 352 | 350.5 |
| Total distillate_____per cent vol__ | 99.5 | 99.5 | 99.5 | 99.5 | 99.5 | 99.5 |
| Residue+loss_____per cent vol__ | 0.5 | 0.5 | 0.5 | 0.5 | 0.5 | 0.5 |
| Sulphur_____per cent wt__ | 0.983 | 0.325 | 0.375 | 0.421 | 0.441 | 0.470 |
| Sulphur removal_____per cent__ | | 66.9 | 61.9 | 57.2 | 55.1 | 52.2 |

TABLE 7

*Run No. CP/46/247*

| Test period No. | Feedstock | 1 | 2 | 3 | 4 | 5 |
|---|---|---|---|---|---|---|
| Hours on stream since regeneration | | 10 | 20 | 29 | 50 | 78 |
| *Operating Conditions* | | | | | | |
| Catalyst charge_____vol. ml__ | 1,003 | | | | | |
| Catalyst charge_____wt. g__ | 850 | | | | | |
| No. of regenerations_____ | 18 | | | | | |
| Total life of catalyst_____hr__ | | 1,630 | 1,640 | 1,649 | 1,670 | 1,698 |
| Direction of flow_____ | Downward | | | | | |
| Average catalyst bed temperature___° F__ | | 760 | 759 | 760 | 761 | 760 |
| Reactor pressure_____p. s. i. ga__ | | 100 | 100 | 100 | 100 | 95 |
| Space velocity_____v./v./hr__ | | 2.03 | 1.99 | 1.98 | 2.00 | 1.98 |
| Recycle gas rate_____c. f. b__ | | 1,980 | 2,000 | 2,010 | 1,990 | 2,010 |
| Recycle gas density (air=1)_____ | | 0.25 | 0.25 | 0.27 | | |
| Recycle gas mol. per cent $H_2$ (±1%)_____ | | 81.5 | 81.5 | 79 | | |
| Gas make_____c. f. b__ | | 26.4 | 12.8 | 7.9 | 1.7 | Nil |
| *Liquid Product* | | | | | | |
| Per cent wt. on feedstock_____ | 100.0 | 97.2 | 99.6 | 100.0 | 99.7 | 99.9 |
| Specific gravity 60°/60° F_____ | 0.8535 | 0.8470 | 0.8465 | 0.8470 | 0.8485 | 0.8490 |
| Gravity_____° A. P. I__ | 34.3 | 35.6 | 35.7 | 35.6 | 35.3 | 35.2 |
| *Distillation* | | | | | | |
| I. B. P._____° C__ | 234 | 125 | | 159 | | |
| 2% vol. @_____° C__ | 249 | 225 | | 228 | | |
| 5% vol. @_____° C__ | 262 | 249 | | 250 | | |
| 10% vol. @_____° C__ | 270.5 | 259 | | 260 | | |
| 20% vol. @_____° C__ | 278 | 273 | | 268 | | |
| 30% vol. @_____° C__ | 283.5 | 279 | | 273 | | |
| 40% vol. @_____° C__ | 288.5 | 285 | | 280 | | |
| 50% vol. @_____° C__ | 294 | 290 | | 285 | | |
| 60% vol. @_____° C__ | 298 | 295 | | 290 | | |
| 70% vol. @_____° C__ | 305.5 | 302 | | 295 | | |
| 80% vol. @_____° C__ | 314.5 | 310 | | 302 | | |
| 90% vol. @_____° C__ | 327.5 | 325 | | 326 | | |
| F. B. P._____° C__ | 353.5 | 355 | | 355 | | |
| Total distillate_____per cent vol__ | 99 | 99 | | 99 | | |
| Residue+loss_____per cent vol__ | 1 | 1 | | 1 | | |
| Sulfur_____per cent wt__ | 1.00 | 0.348 | 0.377 | 0.397 | 0.457 | 0.507 |
| Sulfur removal_____per cent__ | | 65.2 | 62.3 | 60.3 | 54.3 | 49.3 |

TABLE 8

| Catalyst charge | | \multicolumn{12}{c}{1,000 ml. (849 g)} |
|---|---|---|---|---|---|---|---|---|---|---|---|---|
| Direction of flow | | \multicolumn{12}{c}{Downward} |
| Test period No. | Feed | 1 | 2 | 3 | 4 | 5 | 6 | 7 | 8 | 9 | 10 | 11 |
| Hours on stream | | 6 | 16 | 36 | 46 | 56 | 66 | 76 | 86 | 96 | 106 | 116 |
| *Operating Conditions* | | | | | | | | | | | | |
| Average catalyst bed temp. °F | | 778 | 791 | 780 | 780 | 780 | 781 | 780 | 786 | 780 | 774 | 780 |
| Reactor pressure p. s. i. ga. | | 105 | 105 | 105 | 105 | 105 | 105 | 105 | 95 | 100 | 98 | 72 |
| Space velocity v./v./hr. | | 1.98 | 2.13 | 2.08 | 2.04 | 2.01 | 2.02 | 2.00 | 2.00 | 2.05 | 2.05 | 1.99 |
| Recycle gas rate c. f. b. | | 4,040 | 3,760 | 3,850 | 3,920 | 3,980 | 3,960 | 4,000 | 4,000 | 3,900 | 3,900 | 4,020 |
| Recycle gas density (air=1) | | 0.267 | 0.265 | | 0.300 | | | | 0.34 | 0.300 | | |
| Recycle gas mol. per cent H₂ (±1%) | | 80 | 80 | | 76 | | | | 76 | 76 | | |
| Gas make c. f. b. | | 47.5 | 34.5 | 20.3 | 15.8 | 11.6 | 9.0 | 7.1 | 5.1 | 3.7 | 3.4 | 3.1 |
| *Liquid Product* | | | | | | | | | | | | |
| Per cent wt. on feed | 100.0 | 98.70 | 93.85 | 100.39 | 98.33 | 97.85 | 99.13 | 98.66 | 98.36 | 99.30 | 98.70 | 96.00 |
| Specific gravity 60°/60° F | 0.854 | 0.8485 | 0.8475 | 0.8485 | 0.8485 | 0.8490 | 0.8475 | 0.8485 | 0.8495 | 0.8495 | 0.8500 | 0.849 |
| *Distillation* | | | | | | | | | | | | |
| I. B. P. °C | 237 | 148 | 118 | 144 | 169.5 | 175 | 149.5 | 177 | 187 | 188.5 | 206.5 | 204 |
| 2% °C | | 205 | 287 | 227 | 228.5 | 227 | 218 | 217 | 232 | 232 | 240 | 236 |
| 5% °C | 265.5 | 243 | 239.5 | 243.5 | 249.5 | 248 | 241.5 | 241 | 250 | 247.5 | 253 | 251 |
| 10% °C | 271 | 260 | 254 | 258.5 | 259 | 259 | 257.5 | 257 | 261.5 | 259.5 | 264.5 | 261.5 |
| 20% °C | 277.5 | 273 | 270 | 270.5 | 272 | 272 | 270.5 | 270.5 | 272 | 272 | 276.6 | 277.5 |
| 30% °C | 283 | 279 | 279 | 277.5 | 278.5 | 278.5 | 277 | 277.5 | 278.5 | 277 | 280 | 279 |
| 40% °C | 287.5 | 283.5 | 283 | 283 | 283.5 | 283.5 | 282.5 | 283 | 283.5 | 284.5 | 285 | 284.5 |
| 50% °C | 293.5 | 289.5 | 288.5 | 288.5 | 289 | 289 | 288 | 285.5 | 289 | 289.5 | 290 | 290 |
| 60% °C | 299 | 295 | 294.5 | 293.5 | 294.5 | 295 | 293.5 | 295 | 295 | 295.5 | 296.5 | 296 |
| 70% °C | 304.5 | 302 | 301 | 300 | 301 | 301.5 | 300 | 302 | 301.5 | 302.5 | 299.5 | 302.5 |
| 80% °C | 313.5 | 311 | 310 | 308.5 | 309 | 311 | 309 | 310.5 | 311 | 311 | 311.5 | 311.5 |
| 90% °C | 325.5 | 326 | 325 | 321.5 | 322 | 324.5 | 323.5 | 324.5 | 324 | 325 | 326.5 | 325.5 |
| F. B. P. °C | 350 | 349 | 342 | 345 | 345 | 346.5 | 346 | 346.5 | 348 | 347 | 346.5 | 348 |
| Total distillate vol. per cent | 98.5 | 99 | 99 | 99 | 99 | 99 | 98.5 | 99 | 99 | 98 | 98 | 98.5 |
| Residue vol. per cent | 1.5 | 1 | 1 | 1 | 1 | 1 | 1 | 1 | 1 | 0.5 | 1.5 | 1.5 |
| Loss vol. per cent | | | | | | | 0.5 | 0 | 0 | 1.5 | 0.5 | |
| Bromine number | | | | | 1 | | | | | | <1 | |
| Flash point °F | 225 | | | | 106 | | | | | | | |
| Sulphur per cent wt. | 0.99 | 0.369 | 0.279 | 0.333 | 0.349 | 0.366 | 0.294 | 0.343 | 0.401 | 0.436 | 0.458 | 0.497 |
| Sulphur removal per cent | | 63.1 | 72.1 | 66.7 | 65.1 | 63.4 | 70.2 | 65.7 | 59.9 | 56.4 | 54.2 | 49.6 |

TABLE 9

| Catalyst charge | | \multicolumn{7}{c}{880 ml. (763 g)} |
|---|---|---|---|---|---|---|---|---|
| Direction of flow | | \multicolumn{7}{c}{Downward} |
| Number of regenerations | | \multicolumn{7}{c}{2} |
| Test period No. | Feed | 1 | 2 | 3 | 4 | 5 | 6 | 7 |
| Total catalyst life-hours | | 269 | 284 | 309 | 334 | 359 | 384 | 396 |
| Catalyst hours on stream since regeneration | | 10 | 25 | 50 | 75 | 100 | 125 | 137 |
| *Operating Conditions* | | | | | | | | |
| Average catalyst bed temperature °F | | 788 | 792 | 789 | 780 | 789 | 784 | 785 |
| Reactor pressure p. s. i. ga. | | 100 | 100 | 100 | 100 | 100 | 98 | 95 |
| Space velocity v./v./hr. | | 2.32 | 2.25 | 2.26 | 2.27 | 2.35 | 2.24 | 2.45 |
| Recycle gas rate c. f. b. | | 1,960 | 2,080 | 2,010 | 2,000 | 1,930 | 2,030 | 1,850 |
| Recycle gas density (air=1) | | 0.270 | 0.259 | 0.244 | 0.267 | 0.298 | | |
| Recycle gas mol. percent H₂ (±1%) | | 79.0 | 80.5 | 82.0 | 79.5 | 76 | | |
| Gas make c. f. b. | | 50 | 26 | 9 | 5.7 | 2.5 | 0.7 | Nil |
| *Liquid Product* | | | | | | | | |
| Per cent wt. on feed | 100.0 | 98.68 | 98.05 | 98.59 | 97.49 | 99.15 | 98.51 | 91.06 |
| Specific gravity 60° F./60° F | 0.854 | 0.8480 | 0.8485 | 0.8490 | 0.8490 | 0.8505 | 0.8500 | 0.8505 |
| *Distillation* | | | | | | | | |
| I. P. B. °C | 237 | 110 | 124 | 138 | 152 | 160 | 172 | 180 |
| 2% °C | | 210 | 221.5 | 233 | 239 | 241.5 | 242.5 | 243 |
| 5% °C | 265.5 | 240 | 244.5 | 250 | 254 | 253.5 | 253.5 | 256.5 |
| 10% °C | 271 | 254 | 256.5 | 264 | 265 | 263 | 266 | 266.5 |
| 20% °C | 277.5 | 272 | 271.5 | 274.5 | 274 | 275 | 275 | 275.5 |
| 30% °C | 283 | 279 | 280.5 | 280 | 279 | 280 | 281 | 281.5 |
| 40% °C | 287.5 | 285 | 285.5 | 286 | 284 | 285.5 | 285.5 | 286 |
| 50% °C | 293.5 | 290 | 290.5 | 291.5 | 290 | 290.5 | 291 | 291 |
| 60% °C | 299 | 295.5 | 296 | 297 | 296 | 296 | 297 | 297 |
| 70% °C | 304.5 | 302 | 302.5 | 303.5 | 302.5 | 302.5 | 303 | 303 |
| 80% °C | 313.5 | 310 | 311 | 310.5 | 310.5 | 310.5 | 311 | 311.5 |
| 90% °C | 325.5 | 322.5 | 323 | 321.5 | 323 | 322.5 | 323 | 324.5 |
| F. B. P. °C | 350 | 351 | 353 | 350.5 | 348.5 | 349 | 350 | 349.5 |
| Total distillate vol. per cent | 98.5 | 99 | 99 | 99 | 99 | 99 | 99 | 98.5 |
| Residue vol. per cent | 1.5 | 1 | 1 | 1 | 1 | 1 | 1 | 1.5 |
| Loss vol. per cent | | | | | | | | |
| Sulphur wt. per cent | 0.99 | 0.193 | 0.279 | 0.363 | 0.447 | 0.480 | 0.525 | 0.557 |
| Sulphur removal per cent | | 80.5 | 71.8 | 63.3 | 54.8 | 51.5 | 47.0 | 43.7 |

TABLE 10

| Catalyst charge | 880 ml. (763 g) | | | | | | | | | | |
|---|---|---|---|---|---|---|---|---|---|---|---|
| Direction of flow | Downward | | | | | | | | | | |
| Number of regenerations | 3 | | | | | | | | | | |
| Test period No. | Feed | 1 | 2 | 3 | 4 | 5 | 6 | 7 | 8 | 9 | 10 |
| Total catalyst life-hours | | 406 | 421 | 446 | 478 | 496 | 521 | 546 | 571 | 596 | 606 |
| Catalyst hours on stream since regeneration | | 10 | 25 | 50 | 75 | 100 | 125 | 150 | 175 | 200 | 210 |
| *Operating Conditions* | | | | | | | | | | | |
| Average catalyst bed temperature °F | | 780 | 781 | 780 | 781 | 781 | 782 | 782 | 780 | 780 | 781 |
| Reactor pressure p.s.i. ga. | | 105 | 103 | 103 | 105 | 105 | 105 | 105 | 105 | 104 | 104 |
| Space velocity v./v./hr. | | 1.01 | 1.18 | 1.10 | 1.07 | 1.07 | 1.11 | 1.11 | 1.13 | 1.01 | 1.11 |
| Recycle gas rate c.f.b. | | 4,490 | 3,850 | 4,120 | 4,260 | 4,260 | 4,080 | 4,080 | 4,040 | 4,260 | 4,080 |
| Recycle gas density (air=1) | | 0.23 | 0.24 | 0.28 | 0.25 | 0.26 | 0.27 | 0.28 | 0.28 | 0.30 | 0.30 |
| Recycle gas mol. per cent $H_2$ (±1%) | | 84 | 83 | 78 | 82 | 80.5 | 79 | 78 | 78 | 76 | 76 |
| Gas make c.f.b. | | 95 | 76 | 51.5 | 32.4 | 22.6 | 15.8 | 11.6 | 7.9 | 5.6 | 5.4 |
| *Liquid Product* | | | | | | | | | | | |
| Per cent wt. on feed | 100.00 | 99.08 | 99.15 | 98.92 | 99.69 | 96.25 | 99.40 | 100.36 | 101.01 | 100.62 | 99.22 |
| Specific gravity 60°/60° F | 0.854 | 0.8485 | 0.8465 | 0.8470 | 0.8475 | 0.8480 | 0.8495 | 0.8495 | 0.8495 | 0.8505 | 0.8495 |
| *Distillation* | | | | | | | | | | | |
| I.B.P. °C | 237 | 112 | 108 | 106 | 113 | 120 | 120 | 127 | 136 | 128.5 | 126 |
| 2% °C | | 212 | 202.5 | 209 | 196 | 220 | 226 | 231 | 237 | 230.5 | 236 |
| 5% °C | 265.5 | 240.5 | 233.5 | 238.5 | 239.5 | 246.5 | 246 | 250 | 253 | 250 | 253 |
| 10% °C | 271 | 256 | 247.5 | 254 | 254.5 | 262.5 | 260 | 263 | 262.5 | 262 | 263 |
| 20% °C | 277.5 | 271.5 | 270 | 269.5 | 271 | 273.5 | 274.5 | 274 | 275 | 273.5 | 272.5 |
| 30% °C | 283 | 278.5 | 277 | 277.5 | 278 | 280 | 279.5 | 281.5 | 282 | 279.5 | 281 |
| 40% °C | 287.5 | 284 | 283 | 283 | 284.5 | 285 | 285 | 287 | 287.5 | 285.5 | 286 |
| 50% °C | 293.5 | 289.5 | 286.5 | 289 | 290 | 290 | 290.5 | 292 | 293 | 290.5 | 291 |
| 60% °C | 299 | 295.5 | 293.5 | 294.5 | 296 | 295.5 | 295.5 | 297.5 | 298.5 | 296.5 | 296.5 |
| 70% °C | 304.5 | 302 | 299.5 | 300.5 | 302.5 | 302 | 303 | 304.5 | 305 | 303 | 303.5 |
| 80% °C | 313.5 | 310.5 | 308 | 309.5 | 311 | 310 | 311 | 313 | 313.5 | 311.5 | 311 |
| 90% °C | 325.5 | 323.5 | 321.5 | 322 | 324 | 322 | 324 | 326 | 326.5 | 324.5 | 324.5 |
| F.B.P. °C | 350 | 352.5 | 348.5 | 348 | 348 | 349 | 350 | 351.5 | 353 | 350.5 | 350.5 |
| Total distillate vol. per cent | 98.5 | 99 | 98.5 | 98.5 | 98.5 | 98.5 | 99 | 98.5 | 99 | 99 | 98.5 |
| Residue vol. per cent | 1.5 | 1 | 1.5 | 1.5 | 1.5 | 1.5 | 1 | 1.5 | 1 | 1 | 1.5 |
| Loss vol. per cent | | | | | | | | | | | |
| Sulphur per cent wt. | 0.99 | 0.301 | 0.208 | 0.186 | 0.293 | 0.316 | 0.346 | 0.367 | 0.449 | 0.450 | 0.470 |
| Sulphur removal per cent | | 69.6 | 78.9 | 81.2 | 70.4 | 68.1 | 65.1 | 62.9 | 54.6 | 54.5 | 52.5 |

TABLE 11

| Catalyst charge | 990 ml. (903 g) | | | | | | |
|---|---|---|---|---|---|---|---|
| Direction of flow | Downward | | | | | | |
| Number of Regenerations | 5 | | | | | | |
| Test period No. | Feed | 1 | 2 | 3 | 4 | 5 | 6 |
| Total catalyst life-hours | | 757 | 772 | 797 | 822 | 847 | 857 |
| Catalyst hours on stream since regeneration | | 10 | 25 | 50 | 75 | 100 | 110 |
| *Operating Conditions* | | | | | | | |
| Average catalyst bed temperature °F | | 781 | 780 | 779 | 784 | 782 | 783 |
| Reactor pressure p.s.i. ga. | | 103 | 104 | 103 | 101 | 101 | 102 |
| Space velocity v./v./hr. | | 0.993 | 0.989 | 0.978 | 0.978 | 0.978 | 0.978 |
| Recycle gas rate c.f.b. | | 2,010 | 2,020 | 2,040 | 2,040 | 2,040 | 2,040 |
| Recycle gas density (air=1) | | 0.238 | 0.250 | 0.251 | 0.285 | 0.280 | 0.280 |
| Recycle gas, mol. per cent $H_2$ (±1%) | | 83 | 82 | 82 | 77 | 78 | 78 |
| Gas make c.f.b. | | 92.5 | 78 | 36.8 | 22.6 | 11.3 | 7.5 |
| *Liquid Product* | | | | | | | |
| Per cent weight on feed | 100.00 | 98.93 | 95.28 | 98.91 | 101.51 | 99.64 | |
| Specific gravity, 60°/60° F | 0.854 | 0.8475 | 0.8475 | 0.8480 | 0.8480 | 0.8475 | 0.8490 |
| *Distillation* | | | | | | | |
| I.B.P. °C | 237 | 128 | 105 | 108 | 113 | 129 | 116 |
| 2% °C | | 190 | 175 | 192.5 | 225 | 230 | 205 |
| 5% °C | 265.5 | 234 | 233.5 | 237.5 | 244.5 | 249.5 | 243 |
| 10% °C | 271 | 258 | 255 | 265.5 | 260 | 261 | 259 |
| 20% °C | 277.5 | 271 | 269.5 | 271.5 | 271.5 | 274.5 | 272.5 |
| 30% °C | 283 | 277 | 276 | 280 | 278.5 | 280.5 | 279 |
| 40% °C | 287.5 | 282 | 282.5 | 285.5 | 283 | 286 | 284 |
| 50% °C | 293.5 | 287.5 | 287 | 289.5 | 289 | 290 | 288.5 |
| 60% °C | 299 | 294 | 291 | 295 | 295 | 295.5 | 294 |
| 70% °C | 304.5 | 300 | 298.5 | 301 | 301 | 301.5 | 300 |
| 80% °C | 313.5 | 308 | 308 | 308.5 | 309 | 309 | 308.5 |
| 90% °C | 325.5 | 322 | 322 | 320 | 321 | 321.5 | 320 |
| F.B.P. °C | 350 | 349.5 | 352.5 | 350 | 350 | 350 | 347 |
| Total distillate Vol. per cent | 98.5 | 99 | 99 | 99.5 | 99.5 | 99.5 | 99.5 |
| Residue Vol. per cent | 1.5 | 1 | 1 | 0.5 | 0.5 | 0.5 | 0.5 |
| Loss Vol. per cent | | | | | | | |
| Sulphur per cent wt. | 0.99 | 0.287 | 0.220 | 0.302 | 0.374 | 0.426 | 0.420 |
| Sulphur removal per cent | | 71.0 | 77.8 | 69.5 | 62.2 | 57.0 | 57.6 |

The process according to the invention may be operated by setting the pressure in the desulphurisation zone at a predetermined level and thereafter withdrawing from the system gas in excess of that required to maintain the predetermined pressure. In this case, there is a continuous make of hydrogen indicating that the hydrogen produced in the dehydrogenation reaction is not being fully utilised in the desulphurisation reaction.

A method of operation which enables a greater degree of desulphurisation to be achieved, the on-stream hours for a product of given sulphur content to be increased, and the hydrogen produced in the dehydrogenation reaction to be fully utilised in the desulphurisation reaction, consists in recycling the hydrogen-containing gases to the desulphurisation zone and allowing the pressure therein to rise to an equilibrium pressure at which the hydrogen evolved equals the hydrogen consumed.

With this method of operation, since it is convenient to recycle the gas at a constant rate by volume under plant pressure, and in view of the fact that the plant pressure is varying, the volume of gas recycled to the autofining zone at standard conditions of temperature and pressure will therefore also vary.

The advantages to be derived from this method of operation are clearly brought out in the following results obtained when treating an Iraqi gas oil containing 0.8% wt. of sulphur.

When this feedstock was passed to a desulphurisation zone at a space velocity of 2.0 v./v./hr., a temperature of 780° F. and a fixed pressure of 100 lb./sq. in., and excess gas beyond that required to maintain said pressure vented from the system, the residual sulphur after 10 hours on stream was about 0.25% by weight and after 80 hours on stream was about 0.35% by weight, whereas by allowing the pressure in the desulphurisation zone to build up to an equilibrium pressure, the residual sulphur in the product after 10 hours on stream was only about .05% by weight and after 80 hours on stream was just over 0.2% by weight.

It is believed that the greater degree of desulphurisation is attributable to the increased pressure but the equilibrium pressure does not exceed about 200 lb./sq. in. so that the cost of the plant still compares favourably with that of a high pressure hydrogenation plant.

Similarly it will be understood that for a product of given sulphur content the on-stream hours are increased.

The results of treating the aforesaid Iraqi gas oil under the method of operation just described are fully set out in the following table, No. 12.

TABLE 12

Run No. CP/47/127

| Test Period No. | | Feedstock | 1 | 2 | 3 | 4 | 5 | Bulked Product |
|---|---|---|---|---|---|---|---|---|
| Hours on stream since regeneration | | | 12 | 20 | 40 | 59 | 80 | |
| *Operating Conditions:* | | | | | | | | |
| Catalyst charge vol | ml | 1,000 | | | | | | |
| Catalyst charge wt | g | 837 | | | | | | |
| No. of regenerations | | 11 | | | | | | |
| Total life of catalyst | hr | | 453 | 461 | 481 | 500 | 521 | |
| Direction of flow | | Downward | | | | | | |
| Average catalyst bed temperature | °F | | 788 | 786 | 784 | 785 | 786 | |
| Reactor pressure | p.s.i.ga | | 198 | 198 | 178 | 148 | 131 | |
| Space velocity | v./v./hr | | 1.94 | 1.97 | 1.88 | 2.08 | 2.06 | |
| Recycle gas rate | c.f.b | | 4,030 | 3,980 | 3,760 | 2,880 | 2,600 | |
| Recycle gas rate at plant pressure | c.f.b | | 300 | 294 | 310 | 286 | 292 | |
| Recycle gas density (air=1) | | | 0.30 | 0.21 | | | | |
| Recycle gas mol. per cent $H_2$ (±1%) | | | 76 | 86 | | | | |
| Gas make | c.f.b | | 23.8 | 8.8 | Nil | Nil | Nil | |
| *Liquid Product* | | | | | | | | |
| Per cent wt. on feedstock | | 100.0 | | 98.7 | 98.0 | 99.7 | 98.6 | |
| Specific gravity 60°/60° F | | 0.8365 | 0.8265 | 0.8270 | 0.8280 | 0.8285 | 0.8300 | 0.8290 |
| Gravity | °A.P.I | 37.7 | 39.7 | 39.6 | 39.4 | 39.3 | 39.9 | 39.2 |
| *Distillation* | | | | | | | | |
| I.B.P. | °C | 219.5 | | 97 | | 123 | | 106 |
| 2% vol. @ | °C | 229 | | 187.5 | | 202.5 | | 207 |
| 5% vol. @ | °C | 237.5 | | 213.5 | | 220 | | 219.5 |
| 10% vol. @ | °C | 243.5 | | 225 | | 232.5 | | 232 |
| 20% vol. @ | °C | 252.5 | | 239 | | 246 | | 245 |
| 30% vol. @ | °C | 261 | | 251.5 | | 256 | | 255 |
| 40% vol. @ | °C | 270 | | 260.5 | | 263 | | 264 |
| 50% vol. @ | °C | 278.5 | | 270 | | 272.5 | | 275 |
| 60% vol. @ | °C | 288.5 | | 279.5 | | 281.5 | | 283 |
| 70% vol. @ | °C | 299 | | 290 | | 292.5 | | 294 |
| 80% vol. @ | °C | 313 | | 303 | | 306 | | 307.5 |
| 90% vol. @ | °C | 333.5 | | 323.5 | | 326 | | 325.5 |
| F.B.P. | °C | 371 | | 368 | | 368 | | 365.5 |
| Total distillate | per cent vol | 98.5 | | 99 | | 99 | | 99 |
| Residue+loss | per cent vol | 1.5 | | 1 | | 1 | | 1 |
| Corrosion (Cu strip) | | Pass | | | Pass | Pass | | Pass |
| Sulphur | per cent wt | 0.89 | 0.042 | 0.047 | 0.106 | 0.173 | 0.236 | 0.130 |
| Sulphur removal | per cent | | 95.0 | 94.5 | 88.0 | 80.5 | 73.5 | 85.3 |

The results previously described and illustrated in Tables 1–12, were all obtained using the preferred catalyst, cobalt molybdate on alumina. The results set out in the following table, No. 13, show that it is possible to carry out the process of the invention in the use of other catalysts, results being given for cobalt molybdate on bauxite, molydenum oxide on alumina, molybdenum oxide on alumina impregnated with cobalt molybdate, and cobalt chromate on alumina.

TABLE 13

| Catalyst | Cobalt Molybdate on Indian Bauxite | Cobalt Molybdate on American Bauxite | Molybdenum oxide on alumina | Molybdenum oxide on alumina impregnated with cobalt molybdate | Cobalt chromate on alumina |
|---|---|---|---|---|---|
| Feedstock | Iranian Gas Oil (1.0 per cent wt. sulphur) | | | | |
| *Operating Conditions* | | | | | |
| Temperature ° F | 780 | 780 | 780 | 780 | 780 |
| Pressure p. s. i. ga. | 100 | 100 | 100 | 100 | 100 |
| Space velocity v./v./hr. | 2.0 | 2.0 | 2.0 | 2.0 | 2.0 |
| Gas recycle SCF/B | 4,000 | 4,000 | 4,000 | 4,000 | 4,000 |
| *Liquid Product @ 50 hours on stream* | | | | | |
| Per cent desulphurisation | 48 | 51 | 26 | 36 | 24 |
| Gas make, SCF/B | 24 | 19 | 9 | 10 | 12 |

We claim:

1. In a continuous process for the hydrocatalytic desulphurization of a sulphur-and-naphthene-containing petroleum oil boiling substantially in the gas oil range wherein the oil is contacted in vapor form in a reaction zone at an elevated temperature and pressure in the presence of hydrogen with a dehydrogenation-hydrogenation catalyst which is immune to sulphur poisoning and combines activity for the dehydrogenation of naphthenes in said oil to aromatics with activity for the hydrogenation of organically combined sulphur in said oil to hydrogen sulphide, the method of operating the process so that it will be self-supporting with respect to the amount of hydrogen needed and produce a desulphurized product oil having, except for lowered sulphur content, properties and boiling range substantially the same as the feedstock, comprising the steps of passing the gas oil to be treated through said reaction zone and contacting the gas oil therein with said catalyst and with hydrogen derived solely from the oil, maintaining a selected temperature in said zone between about 750° F. to about 820° F. at which hydrogen is continuously produced from said oil, maintaining a selected pressure in said zone between about 50 to about 200 lbs./sq. in. gauge, said selected temperature and pressure being correlated to provide, from the dehydrogenation of naphthenes contained in said oil, a net production of hydrogen at least sufficient to maintain the pressure in said zone substantially constant, separating a hydrogen-rich gas mixture from the treated gas oil, recycling said hydrogen-rich gas mixture to the reaction zone to constitute the whole of the hydrogen supplied to said zone, the hydrogen recycle rate being sufficient to maintain the necessary partial pressure of hydrogen in said zone, and recovering the desired product oil.

2. A process according to claim 1, wherein the feedstock is passed to said reaction zone at a space velocity from between about 1 to 2 v./v./hr., wherein the selected temperature is approximately 780° F., wherein the selected pressure is approximately 100 lbs./sq. in. gauge, and wherein said hydrogen-rich gas mixture is recycled to the reaction zone at a rate between about 2000 to 4000 cu. ft./bbl. of feedstock.

3. A process according to claim 1, wherein the catalyst consists of the combined oxides of cobalt and molybdenum supported on alumina.

PATRICK DOCKSEY.
FREDERICK WILLIAM BERTRAM PORTER.

REFERENCES CITED

The following references are of record in the file of this patent:

UNITED STATES PATENTS

| Number | Name | Date |
|---|---|---|
| 2,325,034 | Byrns | July 27, 1943 |
| 2,392,579 | Cole | Jan. 8, 1946 |
| 2,393,288 | Byrns | Jan. 22, 1946 |
| 2,398,919 | Byrns | Apr. 23, 1946 |
| 2,417,308 | Lee | Mar. 11, 1947 |
| 2,440,236 | Stirton | Apr. 27, 1948 |